US009597980B2

(12) United States Patent
Morishita et al.

(10) Patent No.: US 9,597,980 B2
(45) Date of Patent: Mar. 21, 2017

(54) CONVEYANCE SEAT (71) Applicants: TOYOTA BOSHOKU KABUSHIKI KAISHA, Aichi-ken (JP); SHIROKI CORPORATION, Kanagawa (JP)

(72) Inventors: Kentarou Morishita, Aichi-ken (JP); Keiichi Kondou, Aichi-ken (JP); Tomohiro Enokijima, Aichi-ken (JP); Hideyoshi Kishida, Aichi-ken (JP); Masayuki Kanehira, Gifu-ken (JP); Eiichiro Tsuji, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/494,132

(22) Filed: Sep. 23, 2014

(65) Prior Publication Data
US 2015/0090856 A1    Apr. 2, 2015

(30) Foreign Application Priority Data

Sep. 30, 2013    (JP) ................................. 2013-204160

(51) Int. Cl.
B60N 2/02    (2006.01)
B60N 2/06    (2006.01)
(Continued)

(52) U.S. Cl.
CPC ........... B60N 2/0232 (2013.01); B60N 2/067 (2013.01); B60N 2/075 (2013.01); B60N 2/0705 (2013.01);
(Continued)

(58) Field of Classification Search
CPC  B60N 2/067; B60N 2/0232; B60N 2002/024; B60N 2002/0236; B60N 2/0705; B60N 2/0715; B60N 2/075
(Continued)

(56) References Cited

U.S. PATENT DOCUMENTS 5,150,872 A * 9/1992 Isomura ......................... 248/429
5,959,642 A * 9/1999 Fujioka .................... B41J 19/06
                                                          248/635
(Continued)

FOREIGN PATENT DOCUMENTS

DE    102008010719 A1    8/2009
JP    2006-290131    10/2006
WO    WO2012/005416 A1    1/2012

OTHER PUBLICATIONS

U.S. Appl. No. 14/309,078 to Eiichirou Tuji, filed Jun. 19, 2014.
(Continued)

*Primary Examiner* — Jonathan Liu
*Assistant Examiner* — Guang H Guan
(74) *Attorney, Agent, or Firm* — Greenblum & Bernstein, P.L.C.

(57) ABSTRACT

A conveyance seat includes: a pair of lower rails; a pair of upper rails, each of which is slidably assembled to the corresponding lower rail; an electric drive mechanism; a pair of brackets, each of which is assembled to an upper surface of the corresponding upper rail; and a pair of buffer members, each of which is arranged between the upper surface of the upper rail and the bracket. The electric drive mechanism includes a drive source fastened to one of the brackets; a shaft; a pair of screws assembled one to each rail of the lower rails or the upper rails; a pair of nuts; and a pair of gear subassemblies. The electric drive mechanism electrically slides each upper rail with respect the corresponding lower rail by the screw moving relative to the nut or by the nut moving relative to the screw, by rotation of the shaft when the drive source is driven.

4 Claims, 7 Drawing Sheets (51) Int. Cl.
*B60N 2/07* (2006.01)
*B60N 2/075* (2006.01)

(52) U.S. Cl.
CPC ...... *B60N 2/0715* (2013.01); *B60N 2002/024* (2013.01); *B60N 2002/0236* (2013.01)

(58) Field of Classification Search
USPC ............... 248/419, 420, 422, 424, 429, 430; 296/65.13–65.15; 297/330, 344.1, 344.11
See application file for complete search history.

(56) References Cited

U.S. PATENT DOCUMENTS

| | | | | |
|---|---|---|---|---|
| 6,098,949 A * | 8/2000 | Robinson | ............. | B60T 8/3685 248/609 |
| 6,499,712 B1 * | 12/2002 | Clark et al. | ................... | 248/429 |
| 7,017,891 B2 * | 3/2006 | Izabel | ................... | B60S 1/0416 267/141.4 |
| 7,070,155 B2 * | 7/2006 | Garrido et al. | ............... | 248/424 |
| 7,210,358 B2 * | 5/2007 | Yamazaki | ....................... | 73/761 |
| 7,325,851 B2 * | 2/2008 | Ito | ......................... | B60N 2/067 248/429 |
| 7,641,164 B2 * | 1/2010 | Nakamura | ................... | 248/424 |
| 7,658,429 B2 * | 2/2010 | Koga et al. | ................ | 296/65.15 |
| 7,661,647 B2 * | 2/2010 | Ito | ......................... | B60N 2/0232 248/429 |
| 7,762,514 B2 * | 7/2010 | Koga | ..................... | B60N 2/067 248/429 |
| 8,038,197 B2 * | 10/2011 | Koga | ..................... | B60N 2/067 296/65.18 |
| 8,904,895 B2 * | 12/2014 | Woehrle et al. | ................ | 74/425 |
| 9,056,559 B2 * | 6/2015 | Thuleau | ............. | B60N 2/0232 |
| 2009/0272869 A1 * | 11/2009 | Beneker | ................ | B60N 2/067 248/429 |
| 2010/0264288 A1 * | 10/2010 | Thuleau et al. | ............. | 248/429 |
| 2011/0278419 A1 * | 11/2011 | Sovis | ............................ | 248/429 |
| 2014/0374563 A1 * | 12/2014 | Tuji | ...................... | B60N 2/067 248/429 |
| 2015/0090856 A1 * | 4/2015 | Morishita | ............ | B60N 2/0232 248/429 |

OTHER PUBLICATIONS

German Office Action in counterpart German Application No. 102014219206.4, dated Sep. 15, 2015 (with English-language translation).

* cited by examiner

RELATED ART

CONVEYANCE SEAT

INCORPORATION BY REFERENCE

The disclosure of Japanese Patent Application No. 2013-204160 filed on Sep. 30, 2013 including the specification, drawings and abstract is incorporated herein by reference in its entirety.

BACKGROUND OF THE INVENTION

1. Field of the Invention

The invention relates to a conveyance seat.

2. Description of Related Art

Figure 5:
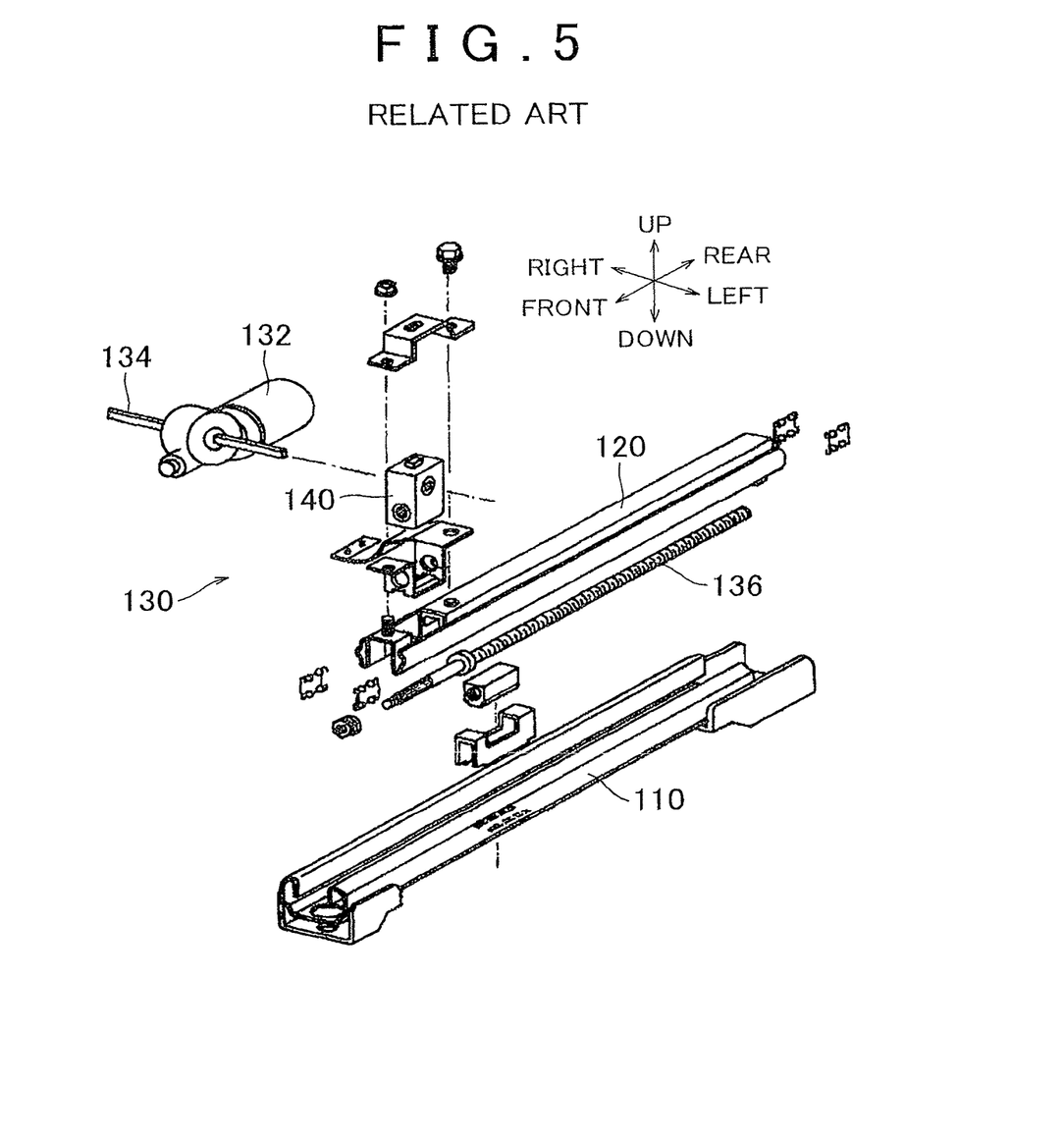
FIG. 5 is an exploded view of a portion of a power slide device according to related art.

Technology of such a conveyance seat is already known and is described in Japanese Patent Application Publication No. 2006-290131 (JP 2006-290131 A), for example. With this technology, an electric drive mechanism 130 that electrically slides an upper rail 120 with respect to a lower rail 110 mainly includes a motor 132, a shaft 134 that rotates when the motor 132 is driven, a screw 136 that is assembled to the upper rail 120, a nut (not shown) that screws onto the screw 136, and a gear subassembly 140 that transmits the rotation of the shaft 134 to the nut (not shown), as shown in FIG. 5. When the motor 132 is driven, the upper rail 120 is electrically slid with respect to the lower rail 110 by the nut (not shown) and the screw 136 moving relative to one another. As a result, the conveyance seat is able to be slid easily.

Figure 6:
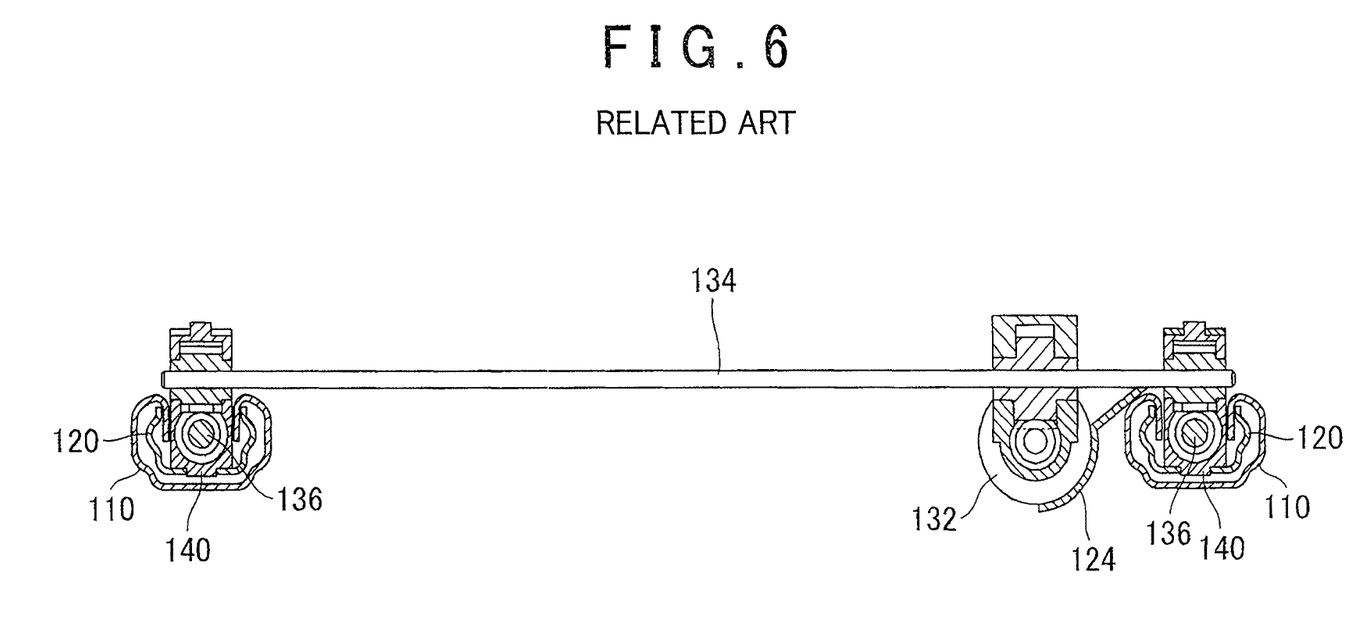
FIG. 6 is a longitudinal sectional view of the power slide device in FIG. 5 in an assembled state.

However, with the technology described in JP 2006-290131 A, the motor 132 is assembled to the upper rail 120 via a bracket 124, as shown in FIG. 6. Therefore, if there is variation in the lower rail 110 or the upper rail 120 due to an offset or error in a vehicle body (not shown), the height position of both ends of the shaft 134 may be off (i.e., the shaft 134 may be inclined).

SUMMARY OF THE INVENTION

The invention thus provides a conveyance seat that includes an electric drive mechanism that electrically slides an upper rail with respect to a lower rail, in which an offset in a height position of both ends of a shaft that rotates when a drive source of the electric drive mechanism is driven is able to be inhibited, even if there is variation in a lower rail or an upper rail.

One aspect of the invention relates to a conveyance seat including: a pair of lower rails that are assembled to a floor-side member; a pair of upper rails, each of which is slidably assembled to the corresponding lower rail; an electric drive mechanism that electrically slides each upper rail with respect to the corresponding lower rail; a pair of brackets, each of which is assembled to an upper surface of the corresponding upper rail; and a pair of buffer members, each of which is arranged between the upper surface of the upper rail and the bracket. The electric drive mechanism includes a drive source that is fastened to one of the brackets; a shaft that rotates by driving force of the drive source; a pair of screws that are assembled one to each rail of the lower rails or the upper rails (i.e., a pair of the screws that are assembled to one of the pairs of the rails, either the lower rails or the upper rails, one of the screw being assembled to each of the rails); a pair of nuts, each of which screws onto the corresponding screw; and a pair of gear subassemblies, each of which transmits rotation of the shaft to the corresponding nut. The electric drive mechanism electrically slides the upper rail with respect the lower rail by the screw moving relative to the nut or by the nut moving relative to the screw, by rotation of the shaft when the drive source is driven.

According to this structure, the height position of the drive source with respect to the upper rail is able to be adjusted by deformation of the buffer member. Therefore, even if there is variation in the lower rail or the upper rail clue to an offset or error in the vehicle body, the buffer member absorbs this variation, thereby enabling an offset in the height position of both ends of the shaft to be inhibited (i.e., enabling the shaft to be inhibited from inclining).

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described with reference to FIGS. 1 to 4. In the description below, a vehicle seat 1 is given as an example of the conveyance seat of the invention. Also, directions of up, down, front, rear, left, and right in the description below indicate directions of up, down, front, rear, left, and right in the drawings that will be described later, i.e., indicate directions of up, down, front, rear, left, and right based on the vehicle seat 1 in a state arranged inside a vehicle (not shown) such as an automobile.

Figure 1:
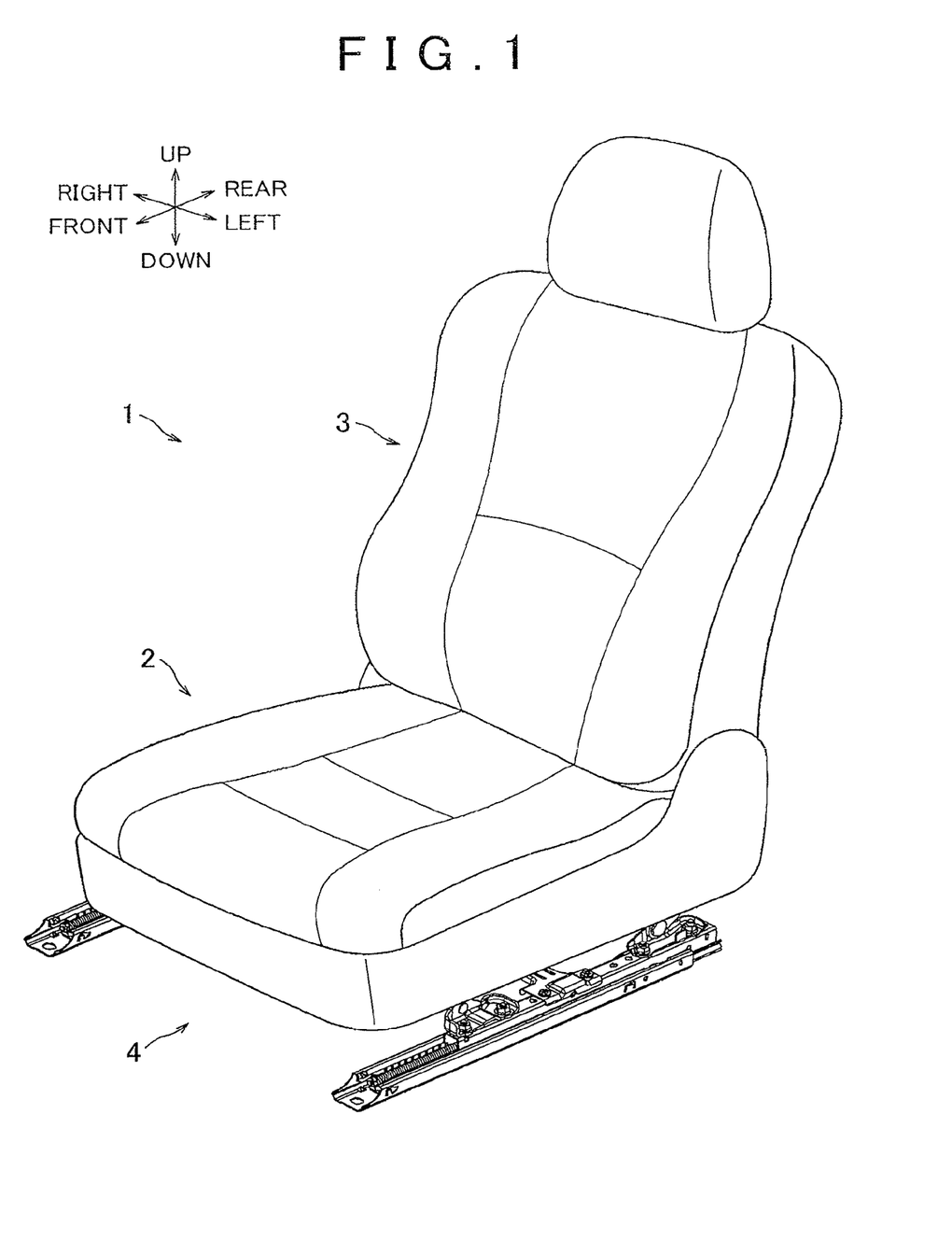
FIG. 1 is an overall perspective view of a conveyance seat according to an example embodiment of the invention.

First, the structure of the vehicle seat 1 will be described with reference to FIG. 1. This vehicle seat 1 includes a seat cushion 2, a seatback 3, and a power slide device 4. Of the scat cushion 2, the seatback 3, and the power slide device 4, the seat cushion 2 and the seatback 3 are well known, so only the power slide device 4 will be described below.

Figure 2:
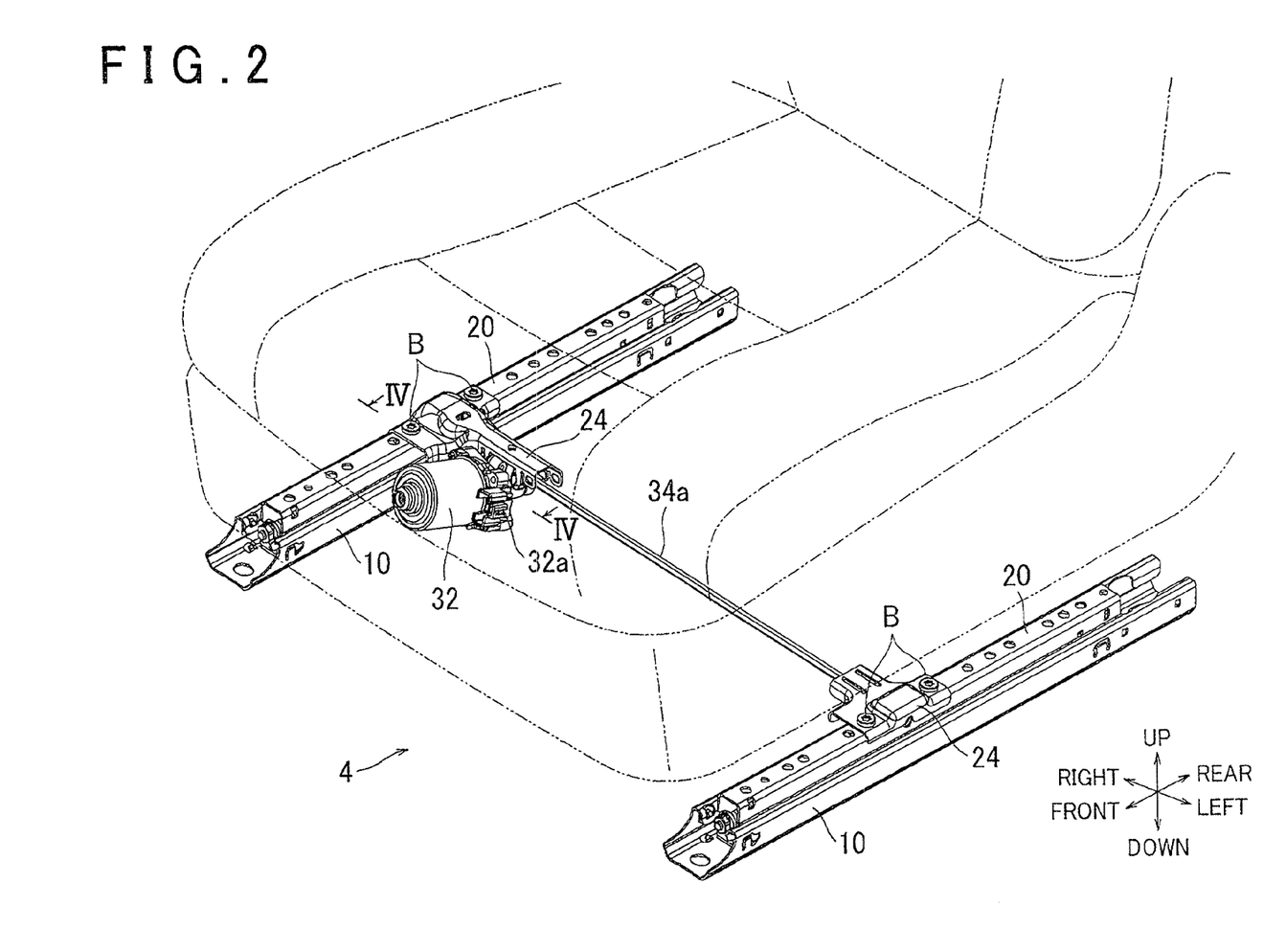
FIG. 2 is an enlarged view of a power slide device in FIG. 1.
Figure 3:
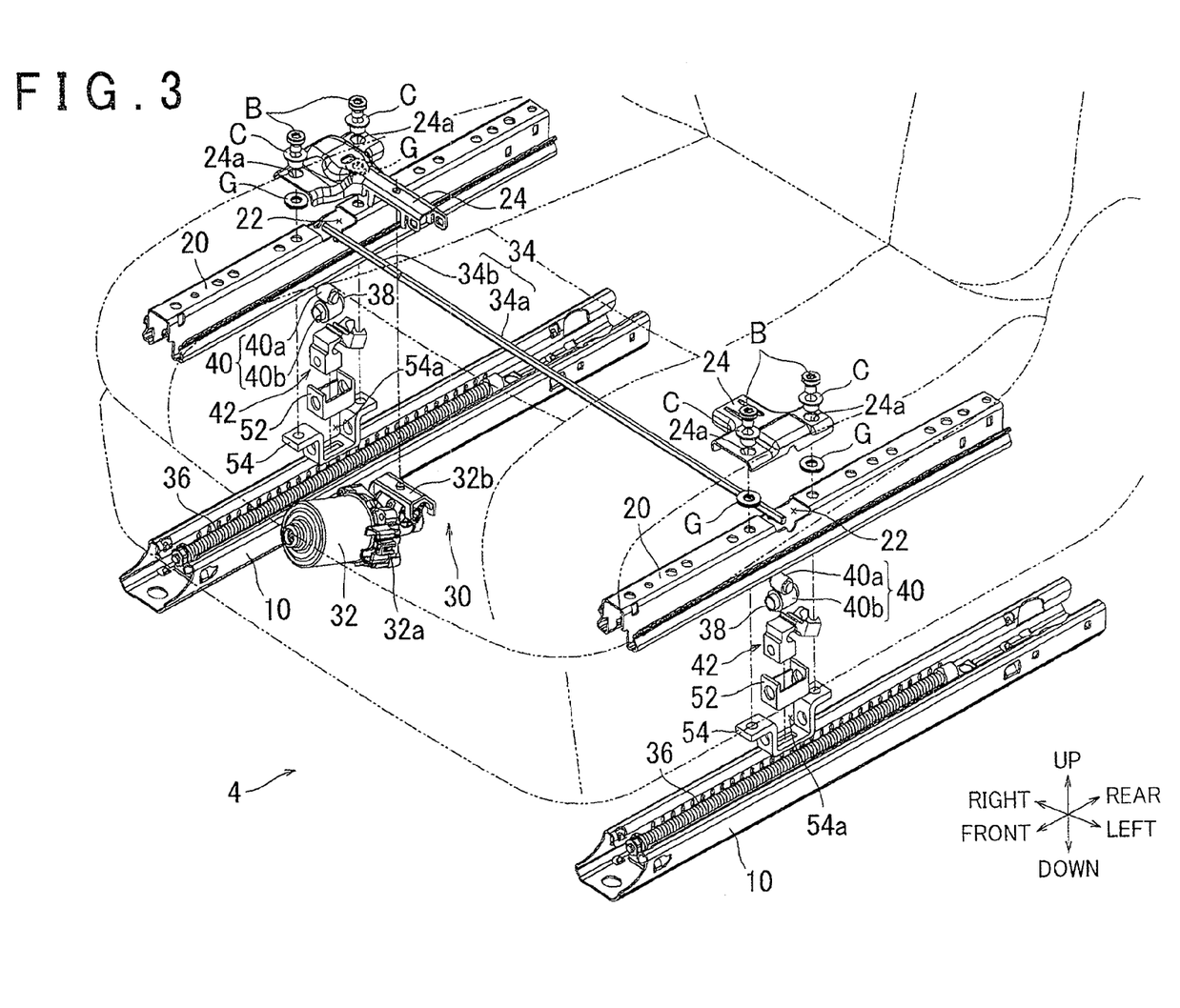
FIG. 3 is an exploded view of FIG. 2.
Figure 4:
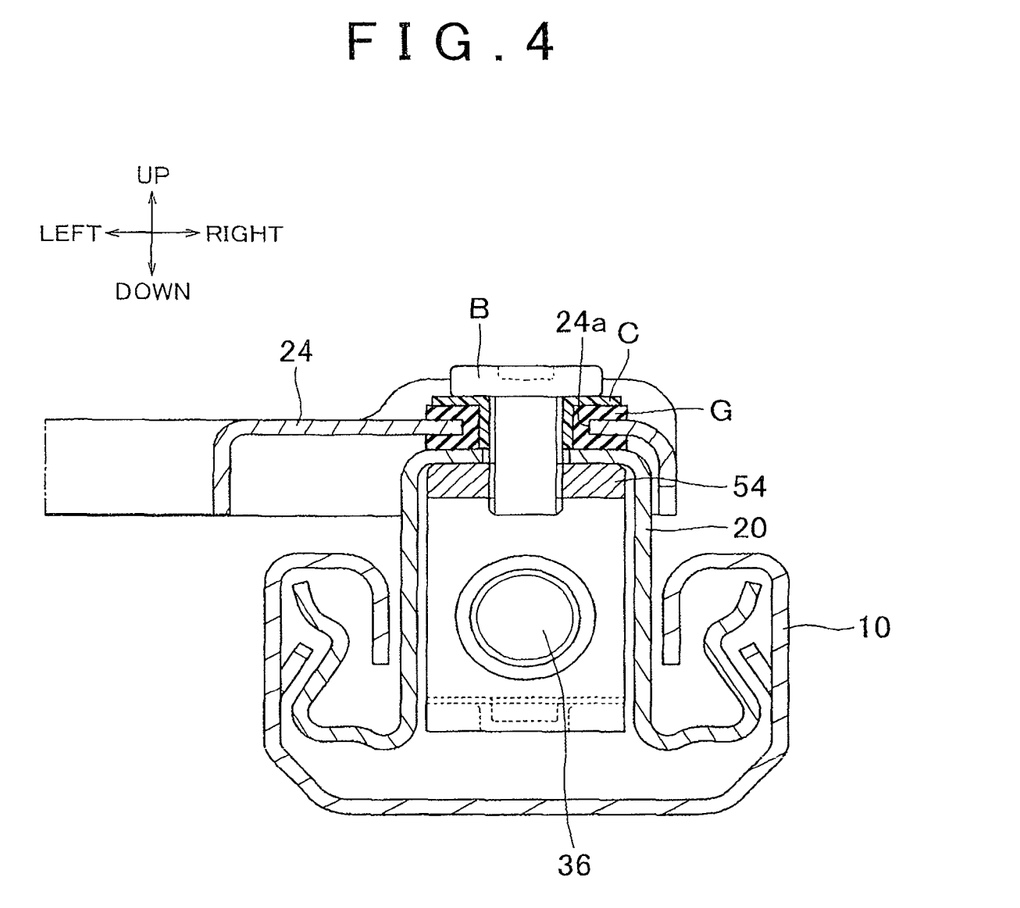
FIG. 4 is a sectional view taken along line IV-IV in FIG. 2.

As shown in FIGS. 2 to 4, the power slide device 4 includes left and right lower rails 10 that are assembled to a floor of a vehicle (not shown), left and right upper rails 20 that are slidably assembled to these left and right lower rails 10, and an electric drive mechanism 30 that electrically slides these left and right upper rails 20 with respect to the left and right lower rails 10. Hereinafter, the left and right lower rails 10, the left and right upper rails 20, and the electric drive mechanism 30 will be described separately. In the description below, parts such as the lower rails and upper rails that are provided in plurality may be described in the singular to simplify the description.

First, the lower rails will be described. The lower rail 10 is formed in a long shape that extends in a longitudinal (front-rear) direction of the vehicle, not shown. Each end portion (i.e., a front end portion and a rear end portion) of this lower rail 10 is fastened to the vehicle body, not shown, via a leg, also not shown. The left and right lower rails 10 are formed in a pair.

Next, the upper rails 20 will be described. The upper rail 20 is also formed in a long shape that extends in the longitudinal (front-rear) direction of the vehicle, not shown, similar to the lower rail 10 described above. This upper rail 20 is formed so as to be able to slide in the longitudinal direction with respect to the lower rail 10. Also, an opening 22 is formed in an upper surface of this upper rail 20. This opening 22 is used to fasten an end of a shaft 34 to a worm gear 40a of a gear subassembly 40, as will be described later.

This opening 22 is covered by a generally T-shaped bracket 24. In this state, rivets B that hold this bracket 24 in place pass through the upper rail 20 and are fastened to a holder 54, described later, that is assembled inside this upper rail 20. That is, the bracket 24 is assembled to an upper surface of the upper rail 20, and the holder 54 is assembled inside the upper rail 20, by these rivets B.

The rivet B is inserted through a rubber member G via a collar C. This collar C makes it possible to obtain axial force with the inserted rivet B, even when the rivet B is inserted into the rubber members G. The rubber member G is provided sandwiching an edge of a mounting hole 24a into which the rivet B is inserted, from both surface sides. Therefore, the rubber member G is arranged between the upper surface of the upper rail 20 and the bracket 24. The left and right upper rails 20 are also formed in a pair, similar to the lower rails 10.

Last, the electric drive mechanism 30 will be described. This electric drive mechanism 30 includes a motor 32, a shaft 34 that includes a left shaft 34a and a right shaft 34b, left and right screws 36, left and right nuts 38, and left and right gear subassemblies 40 each of which has a worm gear 40a and a wheel gear 40b. A reduction unit 32a that has a mounting bracket 32b is provided on the motor 32. This mounting bracket 32b is fastened by crimping to a tip end of the right bracket 24 that will be described later.

The left shaft 34a is connected at one end to the reduction unit 32a, and fastened at the other end to the worm gear 40a of the left gear subassembly 40. Meanwhile, the right shaft 34b is also connected at one end to the reduction unit 32a, and fastened at the other end to the worm gear 40a of the right gear subassembly 40, similar to the left shaft 34a. The left screw 36 is assembled inside the left lower rail 10, while the right screw 36 is assembled inside the right lower rail 10, similar to the left screw 36.

The left nut 38 is assembled in a state screwed onto the left screw 36. The wheel gear 40b of the left gear subassembly 40 is assembled to an outer surface of this left nut 38. Meanwhile, the right nut 38 is assembled in a state screwed onto the right screw 36, similar to the left nut 38. The wheel gear 40b of the right gear subassembly 40 is assembled to an outer surface of this right nut 38.

The worm gear 40a of the left gear subassembly 40 is fastened to the other end of the left shaft 34a, as described above. The worm gear 40a and the wheel gear 40b of this left gear subassembly 40 are able to be connected such that the rotational directions of the two are orthogonal to each other. Meanwhile, the worm gear 40a of the right gear subassembly 40 is fastened to the other end of the right shaft 34b, as described above, similar to the worm gear 40a of the left gear subassembly 40. The worm gear 40a and the wheel gear 40b of this right gear subassembly 40 are able to be connected such that the rotational directions of the two are orthogonal to each other.

The left and right gear subassemblies 40 structured in this way are retained by left and right housings 42, respectively. Also, the left housing 42 is housed in a recess 54a of the U-shaped left holder 54, via a left damper rubber 52, in a state sandwiching the worm gear 40a and the wheel gear 40b of the left gear subassembly 40. The same applies to the right housing 42.

Then, the left holder 54 within which the left housing 42 is housed is assembled inside the left upper rail 20, as described above. When this left holder 54 is assembled inside the left upper rail 20 in this way, the worm gear 40a of the left gear subassembly 40 protrudes from the opening 22, and the other end of the left shaft 34a is able to be fastened to this protruding worm gear 40a. The same applies to the right holder 54. The left and right lower rails 10, the left and right upper rails 20, and the electric drive mechanism 30 together form the power slide device 4.

Continuing on, the operation of the vehicle seat 1 provided with this power slide device 4 will now be described. When the motor 32 is driven, the left and right nuts 38 rotate via the left and right shafts 34 (i.e., the left shaft 34a and the right shaft 34b), and the left and right gear subassemblies 40 (i.e., the left worm gear 40a and the left wheel gear 40b, and the right worm gear 40a and the right wheel gear 40b). As a result, the rotated left and right nuts 38 move with respect to the left and right screws 36, so the left and right upper rails 20 are able to be electrically slid with respect to the left and right lower rails 10.

The vehicle seat 1 according to this example embodiment of the invention is structured as described above. According to this structure, the opening 22 for fastening an end of the shaft 34 to the worm gear 40a of the gear subassembly 40 is formed in the upper surface of the upper rail 20. This opening 22 is covered by the generally T-shaped bracket 24. In this state, the rivets B that hold this bracket 24 in place pass through the upper rail 20, and are fastened to the holder 54 that is assembled inside the upper rail 20. The rubber members G through which the rivets B are inserted are arranged between the upper surface of the upper rail 20 and the bracket 24. Thus, the height position of the motor 32 with respect to the left and right upper rails 20 is able to be adjusted by the deformation of these rubber members G. Therefore, even if there is variation (a left-right difference) in the left and right lower rails 10 and the left and right upper rails 20 due to an error or offset in the vehicle body, not shown, the rubber members G will absorb this variation, so an offset in the height position of both ends of the shaft 34 is able to be inhibited (i.e., the shaft 34 is able to be inhibited from inclining).

The content described above only relates to one example embodiment of the invention. The invention is not limited to this content. In the example embodiment, the vehicle seat 1 is described as an example of the conveyance seat, but the conveyance seat is not limited to the vehicle seat 1. That is, the conveyance seat may also be a seat of any of a variety of types of conveyance, such as a seat of a marine vessel, a seat of an aircraft, or a seat of a railcar, for example.

Figure 7:
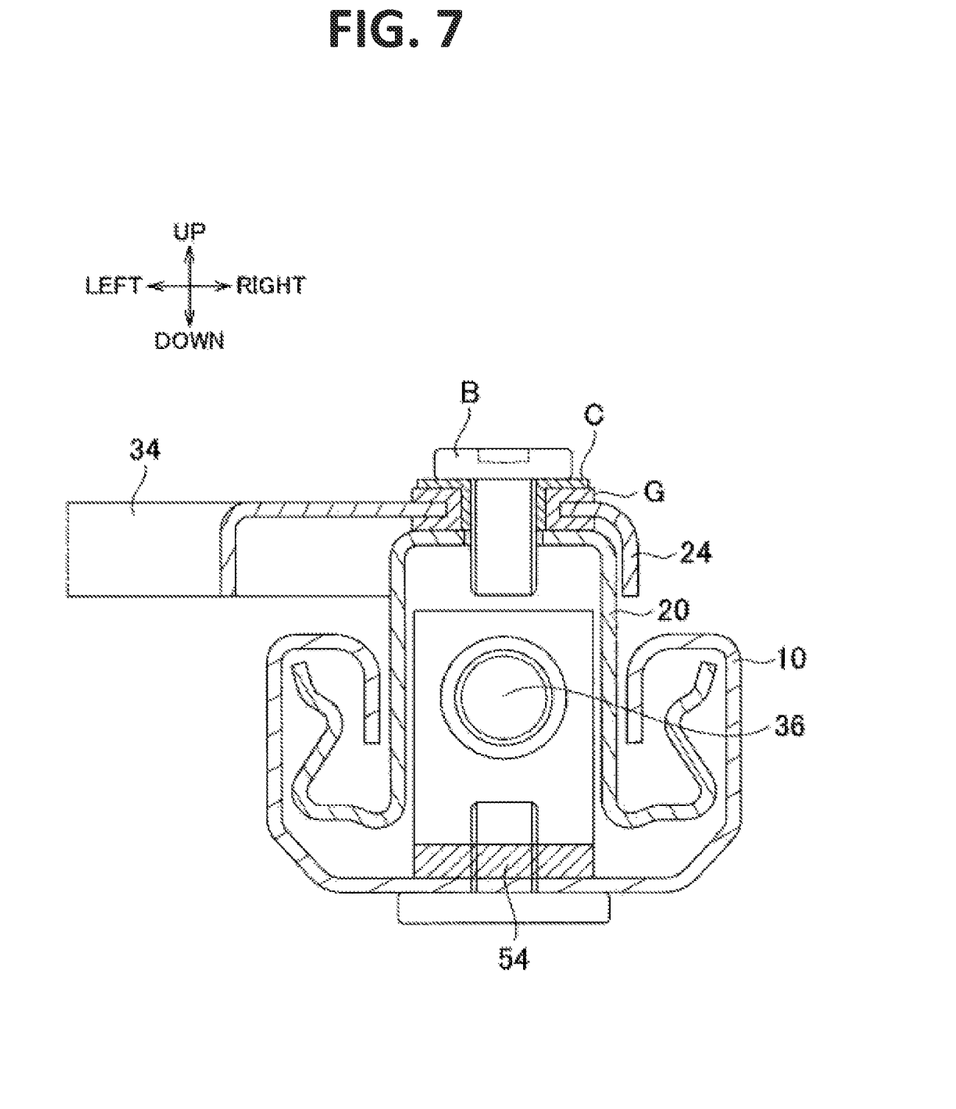
FIG. 7 is a sectional view of a conveyance seat according to an example embodiment of the invention.

Also, in the example embodiment, the left and right screws 36 are described as being assembled to the left and right lower rails 10, but they are not limited to this. That is, the left and right screws 36 may alternatively be assembled to the left and right upper rails 20, as shown in FIG. 7. In this case, the left and right screws 36 are rotated by driving the motor 32.

What is claimed is:

1. A conveyance seat comprising:
a pair of lower rails structured and arranged to be attached to a floor-side member;
a pair of upper rails, each of the pair of upper rails being slidably assembled to a corresponding lower rail of the pair of lower rails;
an electric drive mechanism that electrically slides each upper rail of the pair of upper rails with respect to the corresponding lower rail;
a pair of brackets, each of the pair of brackets being assembled to an upper surface of a corresponding upper rail of the pair of upper rails; and
a pair of buffer members, each of the pair of buffer members being arranged partially between the upper surface of the corresponding upper rail and a bracket of the pair of brackets, wherein:
the electric drive mechanism includes a drive source that is fastened to one of the pair of brackets; a shaft that rotates by driving force of the drive source; a pair of screws, each screw of the pair of screws assembled to a respective rail of the pair of lower rails; a pair of nuts, each of the pair of nuts screwing onto a corresponding screw of the pair of screws; and a pair of gear subassemblies, each of the pair of gear subassemblies transmits rotation of the shaft to a corresponding nut of the pair of nuts; and
the electric drive mechanism electrically slides the upper rails with respect to the lower rails by each nut moving relative to the corresponding screw by rotation of the shaft when the drive source is driven,
wherein each bracket of the pair of brackets includes a mounting hole, an upper surface side and a lower surface side, the conveyance seat further comprises a pair of assembly members and a pair of collars, each of the pair of assembly members and each of the pair of collars are inserted into the mounting hole of a corresponding bracket of the pair of brackets and assemble the corresponding bracket to the upper surface of the corresponding upper rail,
wherein each buffer member is structured and arranged such that each assembly member and each collar are inserted into a corresponding buffer member of the pair of buffer members, and the corresponding buffer member sandwiches an edge of the mounting hole from both the upper and lower surface sides,
wherein each buffer member includes an upper portion, a lower portion, and a connecting portion that connects the upper portion and the lower portion, and the connecting portion is positioned in the mounting hole of the corresponding bracket, and
wherein each collar is disposed between the corresponding assembly member of the pair of assembly members and the corresponding buffer member of the pair of buffer members.

2. The conveyance seat according to claim 1, wherein:
the shaft includes a first shaft and a second shaft;
the first shaft is connected at a first end to the drive source, and fastened at a second end to a first gear subassembly of the pair of gear subassemblies; and
the second shaft is connected at a first end to the drive source, and fastened at a second end to a second gear subassembly of the pair of gear subassemblies.

3. The conveyance seat according to claim 1, wherein:
each collar includes an upper surface portion that contacts the corresponding assembly member of the pair of assembly members.

4. The conveyance seat according to claim 1, wherein:
each collar passes through the mounting hole of the corresponding bracket of the pair of brackets from the upper surface side to the lower surface side of the corresponding bracket.

* * * * *